(12) United States Patent
Laviolette et al.

(10) Patent No.: US 6,964,054 B1
(45) Date of Patent: Nov. 8, 2005

(54) METHOD AND APPARATUS FOR POSTING A COMPUTER HAVING MULTIPLE VIDEO ADAPTERS

(75) Inventors: Terry M. Laviolette, Courtice (CA); Vladimir F. Giemborek, Richmond Hill (CA); Francis Kwok-To Chan, Scarborough (CA); Adrian Mutianu, Toronto (CA)

(73) Assignee: ATI International SRL, Christchurch (BB)

( * ) Notice: Subject to any disclaimer, the term of this patent is extended or adjusted under 35 U.S.C. 154(b) by 739 days.

(21) Appl. No.: 09/628,867

(22) Filed: Jul. 27, 2000

(51) Int. Cl.[7] .............................................. G06F 13/10
(52) U.S. Cl. ..................... 719/321; 711/165; 711/170; 713/2
(58) Field of Search .............................. 713/2; 711/103, 711/165, 170; 719/321, 323, 322

(56) References Cited

U.S. PATENT DOCUMENTS

| | | | | |
|---|---|---|---|---|
| 6,081,891 A | * | 6/2000 | Park ................................ | 713/2 |
| 6,185,696 B1 | * | 2/2001 | Noll ................................ | 714/6 |
| 6,622,200 B1 | * | 9/2003 | Hasbun et al. .................. | 711/103 |
| 6,725,368 B1 | * | 4/2004 | Liebenow ......................... | 713/2 |

* cited by examiner

Primary Examiner—Meng-Al T. An
Assistant Examiner—The Thanh Ho
(74) Attorney, Agent, or Firm—Vedder, Price, Kaufman & Kammholz, P.C.

(57) ABSTRACT

The computer system operates a plurality of display devices 100 and 102. Such a computer system has at least a first video adapter 203 with a first video BIOS and a second video adapter 207 with a second video BIOS. A system BIOS identifies one of the first and second video adapters 203, 207 as a primary video adapter and the other of the first and second video adapters 203, 207 as a secondary video adapter. During POST, the system BIOS stores the first video BIOS in a first memory area 210 in a system memory 212 of the computer. The system BIOS or Video BIOS then copies the first video BIOS to a second memory area 214 in the system memory 212 when the first video adapter 203 is the secondary video adapter. The system BIOS POSTs the second video BIOS when the second video adapter 207 is the primary video adapter, and stores the second video BIOS in the first memory area 210. This then causes the first video BIOS in the first memory area 210 to be overwritten by the second video BIOS. On loading a video driver for the first video adapter 203, the video driver copies the first video BIOS from the second memory area 214 to a third memory area 216 in the system memory 212.

21 Claims, 3 Drawing Sheets

METHOD AND APPARATUS FOR POSTING A COMPUTER HAVING MULTIPLE VIDEO ADAPTERS

FIELD OF THE INVENTION

The present invention relates in general to initialization of computer equipment, and in particular to the POST (power on self test) of multiple video adapters in laptop type computers.

BACKGROUND OF THE INVENTION

It is well known in the art that when a typical computer is turned on, the computer executes a self test program referred to as POST. The program is the BIOS (basic input/output system) that is burned into a ROM chip. The BIOS gives the computer a starter mechanism to run the rest of the software from a floppy disk and/or a hard disk. The BIOS is responsible for booting the computer by providing a basic set of instructions. It performs all the tasks that need to be done at start up time. The BIOS also supplies for the operating system an interface to the underlying hardware of the computer in the form of a library of interrupt handlers.

When the system is powered on, the BIOS performs diagnostics and initializes system components, including the video system. This is commonly referred to as POST. Afterwards, the computer will proceed to its final boot up stage by calling the operating system.

Computer systems are known in prior art that are able to simultaneously operate a plurality of display devices, such as CRT displays and LCD displays. Such computers may have multiple video adapters or may have a dual CRT Controllers graphics card. The multiple displays are used for simultaneously running multiple applications. Under the Windows 98 operating system this concept is known as extended desktop wherein the cursor can drag an icon, file, etc. from the screen of one display device to the screen of another display device. A dual CRT Controllers graphics card is used to operate the two screens of the displays.

Under Windows 98 operating systems, it is possible to operate four displays, which, for example, can be run from a first dual CRT Controller graphics card, and the other two from a second dual CRT Controller graphics card. In this case, the computer system has multiple display adapters. Whatever the configuration, it has become an accepted and desired feature for a computer to have the ability to interface with and operate multiple video adapters for simultaneously running multiple display devices.

With the release of the Windows 2000 operating system and especially in the portable or laptop computer environment, it was found that it was no longer possible to support multiple video adapters if any of the video adapters has compressed Video BIOS. For multiple video cards to operate, it is desirable that all of the Video BIOSs be initialized during POST. However, the Windows 2000 operating system is not capable of doing this. Under the Windows 2000 operating system only the primary video adapter is POSTed. Although this primary video adapter could be a dual CRT Controller graphics card for running two display devices, it is not possible to use an add-on video graphics card with an onboard or built in video adapter. Many motherboards for computers have video adapters built into and stored on the motherboard. That is, the video BIOS is stored in compressed form in a ROM chip on the motherboard.

Portable computers, such as laptops, typically have the video BIOS stored in compressed form on the motherboard. If, however, an add-on video card is used, and if this add-on video card is designated as the primary adapter, the video adapter on the motherboard becomes the secondary video adapter and under the Windows 2000 operating system it is no longer available for use after the POST by the System BIOS.

There is a need for a method and apparatus for executing a POST for each Video BIOS for a computer in which the computer system is capable of operating multiple video adapters. That is, there is a need for operating multiple display devices for multiple displays under the Windows 2000 operating system, especially for laptop computers.

BRIEF DESCRIPTION OF THE DRAWINGS

The features of the present invention which are believed to be novel are set forth with particularity in the appended claims. The invention, together with further objects and advantages, must be understood by reference to the following description taken in conjunction with the accompanying drawings in the several figures of which like reference numerals identify like elements.

DETAILED DESCRIPTION OF A PREFERRED EMBODIMENT OF THE INVENTION

In the following, the term "secondary adapter" means non-VGA, and the frame buffer may be part of system memory or may be a physically separate memory (ram, harddisk, etc).

Generally, the present invention is a computer system for operating a plurality of display devices. Such a computer system has at least a first video adapter with a first video BIOS and a second video adapter with a second video BIOS. A system BIOS identifies one of the first and second video adapters as a primary video adapter and the other of the first and second video adapters as a secondary video adapter. During POST, the system BIOS stores the first video BIOS in a first memory area in a system memory of the computer. The system BIOS or the Video BIOS then copies the first video BIOS to a second memory area (i.e. frame buffer) when the first video adapter is the secondary video adapter. The system BIOS stores the second video BIOS when the second video adapter is the primary video adapter, and POSTs the second video BIOS in the first memory area. This then causes the first video BIOS in the first memory area to be overwritten by the second video BIOS. On loading a video driver for the first video adapter, the video driver copies the first video BIOS from the second memory area to a third memory area in the system memory.

Figure 1:
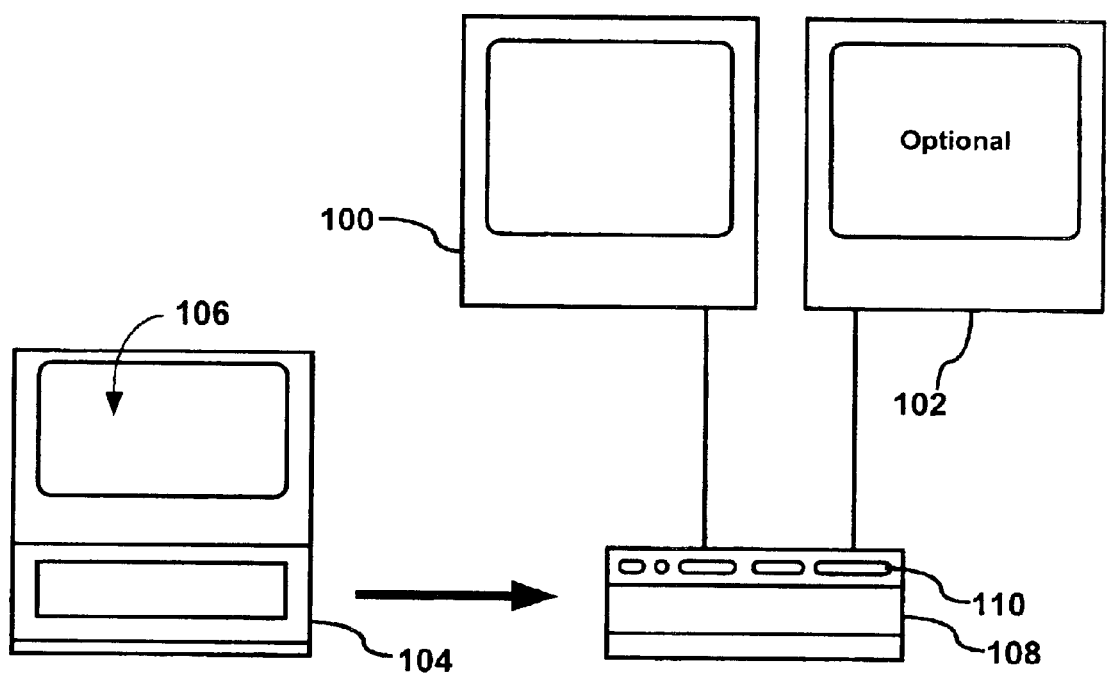
FIG. 1 schematically depicts a computer environment for use with the present invention.

The present invention is particularly useful for operating multiple display devices, such as CRT devices 100 and 102 in FIG. 1. In this computer system, a portable computer or laptop 104 has an LCD display device 106. As is known in the art, the laptop 104 can be inserted into a docking station 108. The laptop 104 interfaces with the docking station 108 through electrical connectors 110. The CRT type display devices 100 and 102 are connected to the docking station 108.

The laptop computer has a motherboard with the first video adapter and has a first video BIOS stored in a ROM on the motherboard. For example, the laptop computer may contain a RAGE™ LT PRO, manufactured by ATI Technologies Inc. This is a high performance 2D, 3D, and DVD graphics accelerator for AGP and PCI notebooks. For laptop computers the video BIOS is stored in compressed form. The docking station has in this embodiment an add-on board with the second video adapter and the second video BIOS. Typically, the add-on board has the second video BIOS stored in an uncompressed form. The add-on video card in the docking station 108 typically has an application-specific integrated circuit (ASIC) which is a graphics chip that is able to perform at a higher level than the video adapter on the motherboard of the laptop 104. For example, the video card in the docking station 108 could be a dual CRT Controller video card, which can simultaneously operate both display devices 100 and 102. Alternatively, the docking station could have a video card, such as, the RAGE™ XL manufactured by ATI Technologies Inc. This is a high performance video card that provides superior 3D acceleration and comprehensive 3D support.

It is also possible to have a configuration, wherein the laptop computer has a dual display feature. In fact, laptop computers that have the ATI RAGE™ MOBILITY 128 graphics chip, manufactured by ATI Technologies Inc., has a Tri-View architecture that allows the video output to be directed to any three of the LCD, TMDS, CRT and TV displays simultaneously. Dual display makes use of a second, independent controller within the graphics chip to display different images on any two of its supported outputs. This is the feature which is supported by Windows 98 operating systems, but not by Windows 2000 operating systems.

Although under the Windows 2000 operating system it is possible to operate both display devices 100 and 102 with a dual CRT Controller video card in the docking station 108, it would not be possible to simultaneously utilize the LCD screen 106 of the laptop 104 with the display devices 100 and 102. This is because, the video BIOS for the video adapter on the motherboard remains compressed and not POSTed and is not available to the video drivers associated with the video adapter on the motherboard. The present invention overcomes this deficiency in the Windows 2000 operating system by providing a modified POST that has minimal impact on the system BIOS and minimal impact on associated video drivers.

Figure 2:
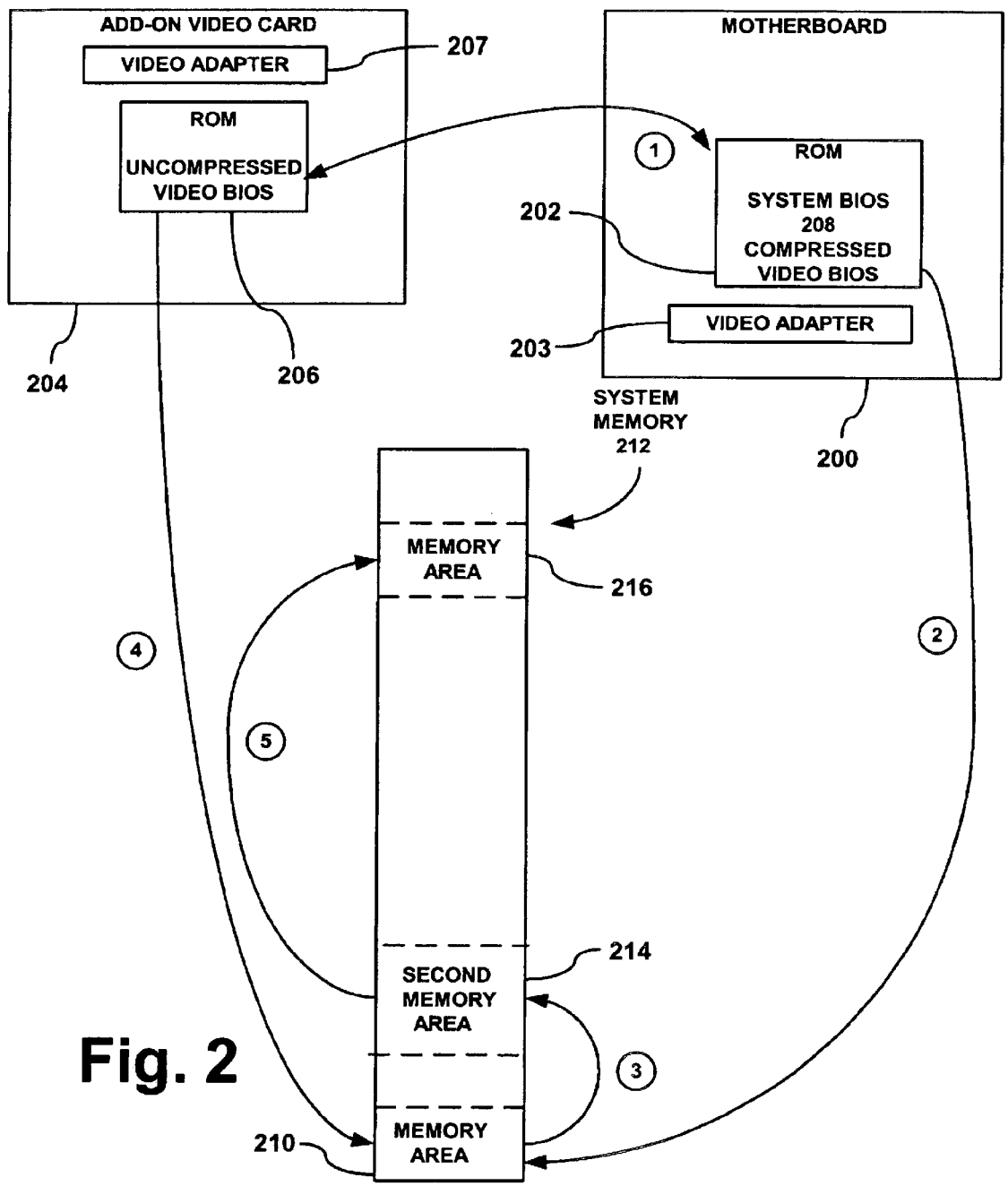
FIG. 2 schematically depicts execution of a POST of a computer system using the present invention.

FIG. 2 schematically depicts the POST of a computer system which has a motherboard 200 with a ROM 202 which contains the system BIOS 208 and the video BIOS in compressed form for a first video adapter 203. The computer system also has an add-on card 204, which has a ROM 206 that has an uncompressed video BIOS for a video adapter 207 on the video card 204. During POST the System BIOS 208 on the motherboard 200 decompresses the motherboard video BIOS and stores it in a first memory location 210 in system memory 212. When the video adapter 203 on the motherboard 200 is a secondary video adapter and the second video adapter on the add-on video card 204 is the primary video adapter, the System BIOS or Video BIOS 208 then copies the uncompressed and POSTed video BIOS for the first video adapter 203 on the motherboard into second memory area 214 (i.e. frame buffer). Although the uncompressed video BIOS of the motherboard can be copied to other locations in the system memory, the frame buffer is easily addressed by the video system of the computer. The uncompressed video BIOS of the add-on video card 204 is then copied and stored in the first memory area 210, which overwrites the video BIOS of the motherboard which was stored there. The video driver for the video adapter 203 on the motherboard 200 can now copy the uncompressed Video BIOS from the motherboard from the second memory area 214 into a third memory area 216 where it can be utilized for ongoing operation of the computer system. It should be understood that the present invention can be extended so that second and third add-on video cards, for example, could be utilized in the computer system. Although the embodiment of the present invention is depicted in the setting of a laptop computer connected to a docking station, other various configurations and combinations of computer equipment and add-on video cards could also be utilized with the present invention.

Figure 3:
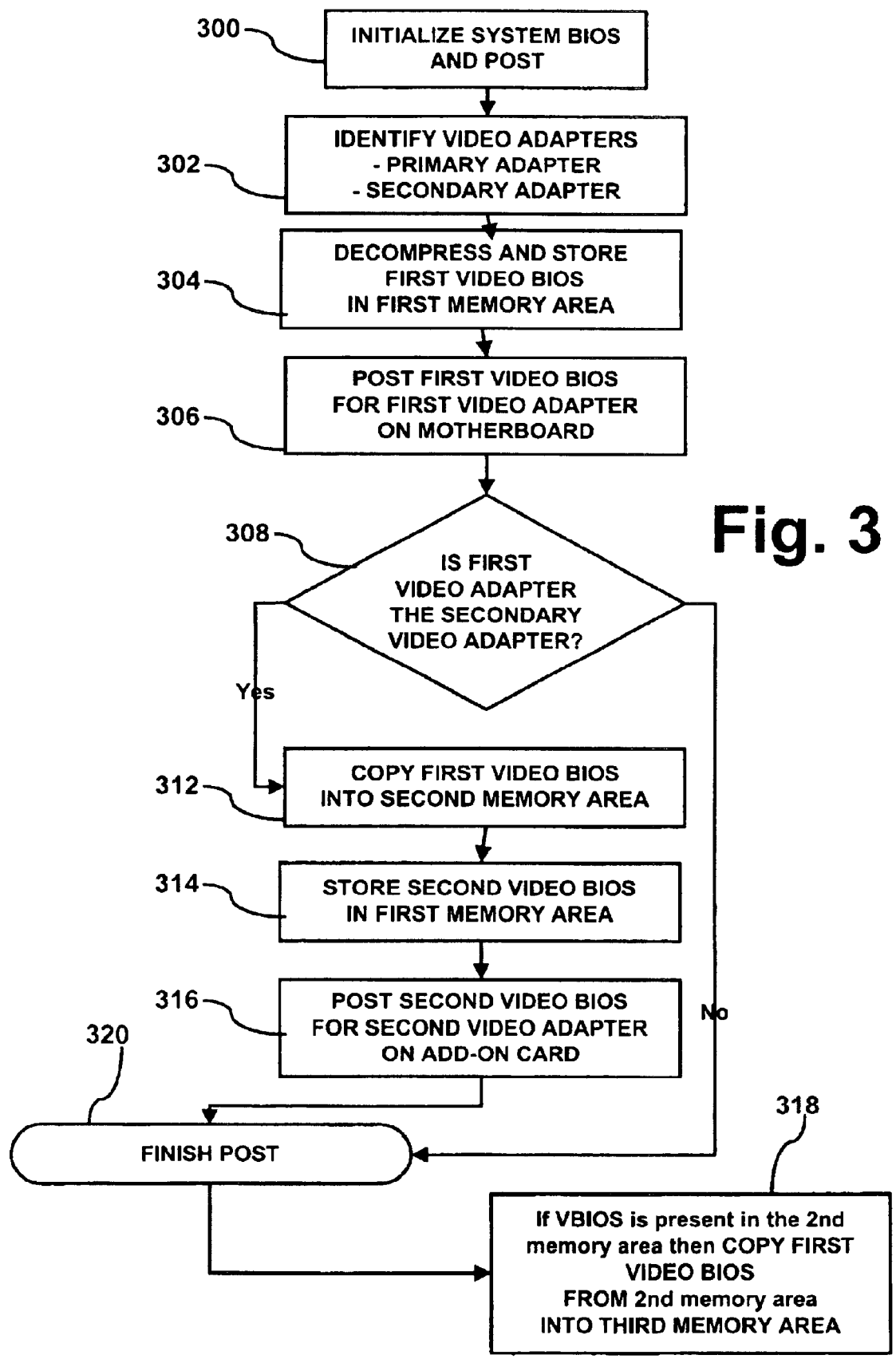
FIG. 3 is a flowchart depicting the steps in the method of the present invention.

FIG. 3 is a flow diagram depicting operation of the present invention. In the first step 300 the computer system is initialized by the system BIOS and the power on self test (POST).is executed. Thereafter, in step 302 the video adapters, for example on the motherboard and on the add-on card, are identified as a primary video adapter and a secondary video adapter. In step 304 the first video BIOS is decompressed and stored in a first memory area of the system memory. In step 306, POST occurs for the first video BIOS on the motherboard.

If, in step 308, it is determined that the first video adapter on the motherboard is the primary video adapter, then the POST continues on to finish in step 320. If, however, the first video is the secondary video adapter, then the uncompressed first video BIOS is copied from the first memory area into the second memory area (i.e. frame buffer) in step 312. The frame buffer is the portion of memory reserved for holding the complete bit-mapped image that is sent to the display device. In step 314 the second video BIOS is stored in the first memory area of system memory, thereby overwriting the previously stored first video BIOS. In step 316 the POST operation continues for the second video BIOS on the add-on video card. In step 318, the first video BIOS is copied by the driver from the second memory area, i.e. frame buffer, to a third memory area of the system memory for use by the video driver for the first video adapter on the motherboard. Finally, the POST goes on to finish in step 320.

Thus, the present invention overcomes the deficiency in the prior art (for example, Windows 2000 operating system) by providing a method and apparatus for operating a plurality of display devices with multi-video adapters. It is also accomplished with the least impact on presently existing system BIOS and on associated drivers. The present invention is not limited to the particular details of the apparatus and method depicted and other modifications and applications are contemplated. Certain other changes may be made in the above-described method and apparatus without departing from the true spirit and scope of the invention herein involved. For example, the present invention is not limited to laptop computers, but can be utilized in any type of computer equipment. Also, the present invention could be utilized with operating systems other than the Windows 2000 operating system. It is intended, therefore, that the subject matter of the depicting shall be interpreted as illustrative and not in a limiting sense.

What is claimed is:

1. A computer system for operating a plurality of display devices, comprising:
   at least a first video adapter with a first video BIOS and a video driver, and a second video adapter with a second video BIOS;
   a processing unit;
   a system memory operatively coupled to the processing unit;
   a read only memory operatively coupled to the processing unit, the read only memory storing a system BIOS that, when read by the processing unit, causes the processing unit to identify one of the first and second video adapters as a primary video adapter and the other of the first and second video adapters as a secondary video adapter;

the processing unit, as directed by the system BIOS, executing a POST (power on self test) during which the system BIOS stores the first video BIOS in a first memory area in the system memory of the computer system, and copies the first video BIOS to a second memory area in the system memory, when the first video adapter is the secondary video adapter and the second video adapter is the primary video adapter, thereafter the second video BIOS being stored in the first memory area, thereby overwriting the first video BIOS in the first memory area; and the video driver for the first video adapter, the video driver copying the first video BIOS from the second memory area to a third memory area in the system memory;

wherein the computer system uses at least one of the first and second video adapters to display information on at least one display device connected to the computer.

2. The computer system according to claim 1, wherein the computer system further comprises a motherboard, the motherboard having stored thereon the first video BIOS and the first video adapter.

3. The computer system according to claim 2, wherein the computer system further comprises a motherboard, the motherboard having stored thereon the first video BIOS and the first video adapter, wherein the computer system further comprises an add-on board, the add-on board having stored thereon the second video BIOS, wherein the first video BIOS is stored on the motherboard in compressed form, and wherein the first video BIOS is stored in the first memory area in decompressed form.

4. The computer system according to claim 1, wherein the computer system further comprises an add-on board, the add-on board having stored thereon the second video BIOS.

5. The computer system according to claim 1, wherein the second video BIOS is stored in uncompressed form.

6. The computer system according to claim 1, wherein the computer system comprises a portable computer having the first video adapter and a docking station for receiving the portable computer, the docking station having the second video adapter.

7. The computer system according to claim 6, wherein the portable computer has a first display device, and wherein a second display device is operatively connected to the docking station.

8. The computer system according to claim 7, wherein the first video adapter provides display data to the first video device, and wherein the second video adapter provides display data to the second video device.

9. The computer system according to claim 1, wherein the computer system further comprises a frame buffer operatively connected to the processing unit, and wherein the second memory is the frame buffer.

10. A computer system for operating a plurality of display devices, comprising:
   a motherboard, the motherboard having a first video adapter with a first video BIOS and a video driver, the first video BIOS being stored on the motherboard in compressed form;
   an add-on board, the add-on board having a second video adapter with a second video BIOS, the second video BIOS being stored in a first memory area in decompressed form;
   a system memory having a plurality of memory areas;
   the motherboard of the computer system, having stored thereon a system BIOS that, during a POST of the computer system, identifies the second video adapter as a primary video adapter and the first video adapters as a secondary video adapter;
   the system BIOS structured to decompress the first video BIOS and storing the decompressed first video BIOS in the system memory of the computer, to copy the decompressed first video BIOS to a second memory area in the system memory, and thereafter to store the second video BIOS in the first memory area, thereby overwriting the first video BIOS in the first memory area;
   the video driver structured to copy the first video BIOS from the second memory area to a third memory area in the system memory;
   wherein the computer system uses at least one of the first and second video adapters to display information on at least one display device connected to the computer..

11. The computer system according to claim 10, wherein the computer system comprises a portable computer containing the motherboard with the first video adapter and a docking station for receiving the portable computer, the docking station containing the add-on board with the second video adapter.

12. The computer system according to claim 11, wherein the portable computer has connected thereto the first display device, and wherein the second display device is operatively connected to the docking station.

13. The computer system according to claim 10, wherein the first video adapter provides display data to at least the first video device, and wherein the second video adapter provides display data to at least the second video device.

14. A method for posting a computer system having at least a first video adapter with a first video BIOS and a second video adapter with a second video BIOS, comprising the steps of:
   initializing a system BIOS of the computer system;
   identifying the second video adapter as a primary video adapter and the first video adapter as a secondary video adapter;
   posting the first video BIOS;
   storing the first video BIOS in a first memory area in a system memory of the computer;
   copying the first video BIOS to a second memory area;
   posting the second video BIOS;
   storing the second video BIOS in the first memory area, thereby overwriting the first video BIOS in the first memory area;
   loading a video driver for the first video adapter;
   copying the first video BIOS from the second memory area to a third memory area in the system memory;
   using at least one of the first and second video adapters to display information on at least one display device connected to the computer.

15. The method according to claim 14, wherein the computer system comprises a motherboard, the motherboard having stored thereon in compressed form the first video BIOS.

16. The method according to claim 15, wherein the system BIOS, during POST, decompresses first video BIOS, and stores the decompressed first video BIOS in the first memory area of the system memory.

17. The method according to claim 14, wherein the computer system has an add-on board, the add-on board having stored thereon the second video BIOS in uncompressed form.

18. The method according to claim 14, wherein the computer system comprises a portable computer having the first video adapter and a docking station for receiving the portable computer, the docking station having the second video adapter.

19. The computer system according to claim 18, wherein the portable computer has a first display device, and wherein at least a second display device is operatively connected to the docking station the first video adapter providing display data to the first video device, and the second video adapter providing display data to the second video device.

20. The method according to claim 14, wherein the computer system has a plurality of video adapters and respectively associated display devices.

21. A computer system for operating a plurality of display devices, comprising:

- at least a first video adapter with a first video BIOS and a video driver, and a second video adapter with a second video BIOS;
- a processing unit;
- a system memory operatively coupled to the processing unit;
- a read only memory operatively coupled to the processing unit, the read only memory storing a system BIOS that, when read by the processing unit, causes the processing unit to identify one of the first and second video adapters as a primary video adapter and the other of the first and second video adapters as a secondary video adapter;
- the processing unit, as directed by the system BIOS, executing a POST (power on self test) during which the system BIOS stores the first video BIOS in a first memory area in the system memory of the computer system, and copies the first video BIOS to a second memory area in the system memory, when the first video adapter is the secondary video adapter and the second video adapter is the primary video adapter, thereafter the second video BIOS being stored in the first memory area, thereby overwriting the first video BIOS in the first memory area; and
- the video driver for the first video adapter, the video driver copying the first video BIOS from the second memory area to a third memory area in the system memory;
- wherein the computer system uses the plurality of first and second video adapters for displaying information on a plurality of display devices connected to the computer.

* * * * *